United States Patent [19]
Jung et al.

[11] Patent Number: 6,110,413
[45] Date of Patent: Aug. 29, 2000

[54] 3-STAGE FLUIDIZED BED TYPE FINE IRON ORE REDUCING APPARATUS HAVING X-SHAPED CIRCULATING TUBES

[75] Inventors: Uoo Chang Jung; Nag Joon Choi; Heung Won Kang; Hang Goo Kim, all of Pohang, Rep. of Korea

[73] Assignees: Pohang Iron & Steel Co., Ltd.; Research Institute of Industrial Science & Technology, both of Rep. of Korea; Voest-Alpine Industrieanlagenbau, Austria

[21] Appl. No.: 09/125,557

[22] PCT Filed: Dec. 19, 1997

[86] PCT No.: PCT/KR97/00275

§ 371 Date: Aug. 20, 1998

§ 102(e) Date: Aug. 20, 1998

[87] PCT Pub. No.: WO98/28449

PCT Pub. Date: Jul. 2, 1998

[30] Foreign Application Priority Data

Dec. 23, 1996 [KR] Rep. of Korea ............... 96-70110

[51] Int. Cl.$^7$ ................................................ C22B 1/10
[52] U.S. Cl. .................................. 266/172; 266/156
[58] Field of Search ........................ 266/172, 156, 266/142; 75/444, 450

[56] References Cited

U.S. PATENT DOCUMENTS

| 4,420,332 | 12/1983 | Mori et al. .......................... 75/26 |
| 5,762,681 | 6/1998 | Lee et al. .......................... 75/446 |
| 5,785,733 | 7/1998 | Lee et al. .......................... 266/172 |
| 5,897,829 | 4/1999 | Kim et al. .......................... 266/172 |

FOREIGN PATENT DOCUMENTS

| 58-217615 | 12/1983 | Japan . |
| 0070456 | of 1994 | Rep. of Korea . |
| 9621044 | 7/1996 | WIPO . |

*Primary Examiner*—Scott Kastler
*Attorney, Agent, or Firm*—Webb Ziesenheim Logsdon Orkin & Hanson, P.C.

[57] ABSTRACT

A 3-stage fluidized bed type iron ore reducing apparatus having X shaped circulating tubes is disclosed for forming a gas pore fluidizing layer of a fine iron ore, and for drying/pre-heating it to reduce it, so that the gas utilization rate and the reducing rate can be improved, as well as decreasing the gas consumption rate. The present invention relates to a 3-stage fluidized bed type iron ore reducing apparatus having X shaped circulating tubes comprising: a shaft type single type first fluidized bed furnace where a raw fine iron ore is dried and pre-heated in a bubbling fluidization state; a first cyclone for collecting fine iron ore particles from a exhaust gas of said first fluidized bed type furnace; a shaft type single type second fluidizing bed furnace where the dried and pre-heated fine iron ore is pre-reduced in a bubbling fluidization state; a second cyclone for separating the fine iron ore particles from a exhaust gas from said second fluidizing bed type furnace so as to re-circulate them; a twin type third fluidized bed furnace consisting of a first reaction furnace and a second reaction furnace, for separating the pre-reduced iron ore from said second fluidized bed type furnace into coarse particles and medium/fine particles so that the coarse particles and medium/fine particles ore finally reduced in separate reactors in bubbling fluidization states; and a third cyclone for separating fine iron ore particles from the exhaust gas of said second reaction furnace of said third fluidized bed type furnace so as to re-circulate them to said first reaction furnace.

4 Claims, 4 Drawing Sheets

3-STAGE FLUIDIZED BED TYPE FINE IRON ORE REDUCING APPARATUS HAVING X-SHAPED CIRCULATING TUBES

BACKGROUND OF THE INVENTION

1. Field of the Invention

The present invention relates to a 3-stage fluidized bed fine iron ore reducing apparatus, in which a fine iron ore having a wide particle size distribution is reduced to a solid reduced iron within 3-stage fluidized bed furnaces in a stepwise manner before being put into a melting furnace. Particularly, the present invention relates to a 3-stage fluidized bed reducing apparatus in which the gas utilization rate and the reduction rate are improved.

2. Description of the Prior Art

In the conventional blast furnace, iron ore can be reduced based on the fixed bed method, because the solid particles have large sizes. However, in the case where a fine iron ore is to be reduced, if the superficial gas velocity is low as in the case of the fixed bed method, a sticking phenomenon occurs and the operation will finally be interrupted. Therefore, in this case, a fluidized bed method, in which the gas velocity is relatively high so as to make the movements of solid particles brisk, is necessarily employed.

The fluidized bed technology is widely applied to various industrial fields including the gasification of coal, boilers, oil refinery, roasting, the burning of waste materials and the like. Recently this technology has been extensively applied to the melting-reducing method which is a potential iron making technique in near future, and in which a solid iron ore is reduced by using a reducing gas.

In the conventional melting-reducing method, an iron ore is reduced in a cylindrical fluidized bed reducing furnace, and then it is transferred to a melting furnace to make pig iron. In this reducing furnace, the solid iron ore is reduced before melting it. The iron ore which is put into a reducing furnace is reduced within the melter-gasifier by means of a high temperature reducing gas obtained from the burning of fine coal or by means of a natural gas and by making the iron ore react with the reducing gas of high temperature and pressure for a certain period of time. This reducing process is classified into a fixed bed, a moving bed and a fluidized bed depending on the particle size of the iron ore and the mutual contacts between the reducing gas and the solid iron ore. In the case where a fine iron ore is reduced, a solid iron ore is put into a reducing furnace, and a reducing gas is supplied through a gas distributor. Thus the iron ore is fluidized, so that the contact area between the gas and the solid particles can be increased, thereby improving the reactivity. This fluidized bed method is known to be most efficient for the reduction of fine iron ores. So far, the iron ore reducing process which is based on the fluidized method and which is to be commercialized includes DIOS of Japan, and HISMELT and FIOR of Australia.

A fluidized bed reducing furnace is disclosed in Japanese Utility Model Application Laid-open No. Sho-58-217615. This fluidized bed reducing furnace is illustrated in FIG. 1. Referring to this drawing, the furnace includes a cylindrical reducing furnace 111 and a cyclone 115. The cylindrical reducing furnace 111 includes: a raw iron ore inlet 112, a high temperature reducing gas inlet 113, and a reduced iron ore outlet 114. In addition, a gas distributor 116 is installed in the lower portion of the reducing furnace.

The reducing process in the fluidized bed fine iron ore reducing furnace is carried out in the following manner.

A reducing gas is supplied through the gas distributor 116 at a desired flow rate, and a fine iron ore is put through the inlet 112. Then the iron ore is reacted with the high temperature reducing gas while being agitated. Then after elapsing of some period of time, the reduced fine ore is discharged through the outlet 114.

Under this condition, the pattern of the fluidized bed is as follows. That is, the reducing gas forms gas bubbles within the reducing furnace, and as the gas bubbles pass through the particle layer of the upper portion of the reducing furnace, the gas bubbles grow bigger and bigger.

In the view of economical sense such as the productivity in the fluidized bed reducing furnace, the elutriation of the fine iron ore which flies to the outside of the furnace has to be reduced, the consumption of the reducing gas has to be minimized, and the gas utilization has to be maximized. If these are to be achieved, the particle size of the raw iron ore has to be sternly limited. Therefore, there is a problem that a wide distribution of particle sizes cannot be accommodated.

In the above described conventional fluidized bed type reducing furnace, the particle size distribution of a wide range cannot be allowed, and therefore, it is limited to 1–0.5 mm, –1 mm, or 1–2 mm. However, the particle sizes of the actually available fine iron ore are 8 mm and less. Therefore, they are screened before use, and the large particles are crushed before use. Consequently, the productivity becomes lower and additional process and facilities for screening and crushing are needed, thereby leading to less profitability.

Meanwhile, in order to overcome the above described disadvantages, a twin fluidized bed reducing furnace was disclosed in Korean Patent 74056.

This twin fluidized bed reducing furnace is illustrated in FIG. 1. Referring to FIG. 1, this reducing furnace includes: a first pre-reducing furnace 210 for reducing coarse iron ore; a second pre-reducing furnace 220 for reducing medium and fine iron ores; first and second cyclones 240 and 230; and a hopper 250 for supplying the iron ore.

The first pre-reducing furnace 210 includes: a reducing gas inlet 211 formed on the bottom of it; a gas distributor 212 installed on the lower portion of it; a first outlet 213 formed at a side of lower portion of it; and a second circulating tube 214 formed at a side of upper portion of it, and connected to the second pre-reducing furnace 220. Further, the lower portion of the first pre-reducing furnace 210 is connected through a first circulating tube 231 to the lower portion of the second cyclone 230.

The second pre-reducing furnace 220 includes: a reducing gas supply hole 221 formed on the bottom of it; a gas distributor 222 installed on the lower portion of it; a second outlet 223 formed at a side of lower portion of it; and the upper portion of the furnace 220 being connected to the upper portion of the first cyclone 240.

The upper portion of the first cyclone 240 is connected through a tube to the upper portion of the second cyclone 230. The bottom of the first cyclone 240 is connected through a third circulating tube 241 to a middle portion of the second pre-reducing furnace 220.

The top of the second cyclone 230 is provided with a gas outlet, so that the exhaust gas can be released to the outside after being reacted with the fine iron ore. Meanwhile, the hopper 250 which supplies the iron ore is connected to a side portion of the first circulating tube 231 which connects the first pre-reducing furnace 210 to the second cyclone 230. The first circulating tube 231 and the third circulating tube 241 are respectively provided with a plurality of purging gas supply holes P, so that a clogging would be prevented. A third outlet 242 is formed on an intermediate portion of the third circulating tube 241.

The operating process in the twin fluidized bed iron ore reducing apparatus is carried out in the following manner.

A fine iron ore is supplied from the hopper 250 to the first circulating tube 231. This fine iron ore is transferred to the first pre-reducing furnace 210. Under a controlled gas velocity the coarse iron ore particles form a bubbling or turbulent fluidized bed together with the reducing gas while being reduced. The reduced iron ore is discharged through the outlet 213.

Meanwhile, the medium and fine iron ores are pneumatically transported through the second circulating tube 214 into the lower portion of the second pre-reducing furnace 220 owing to the flow of the high velocity gas which is supplied through the first pre-reducing furnace 210 to the second pre-reducing furnace 220. In this condition, the relatively larger iron ore particles stay within the lower portion of the reaction vessel 220, while the extremely fine particles of 500 μm or less are elutriated into the first cyclone 240, where the captured fine ore is fed back into the second pre-reducing furnace through the second circulating tube 241. Thus the iron ore is reduced for a certain period of time. Further, among the reduced iron ore, the medium iron ore particles are discharged through the second outlet 223, while the fine particles are discharged through the third outlet 242.

A plurality of purging gas supply holes P are formed on the intermediate portions of the second circulating tube 214 and the third circulating tube 241 respectively, and gas supply tubes S are connected to the plurality of the purging gas supply holes P respectively. Thus the circulating tubes 214 and 241 in which the medium/fine iron ores circulated can be prevented from being clogged. Therefore, the particle flows become smooth.

In the fluidized bed reducing furnace of the above mentioned Korean patent, the reduction is carried out by separating the coarse and medium/fine iron ores by proper gas velocities, and therefore, the fluidizing of the iron ore having a wide particle size distribution range can be made stable. Therefore, the concentration of the iron ore can be uniformly maintained, and the reduction degree can be improved.

In the twin fluidized bed, however, the medium/fine iron ores are pneumatically transported through the second circulating tube 214 to the second reducing furnace 220 by a large amount of high velocity gas which has been highly oxidized in the first pre-reducing furnace 210 by the reduction of the coarse iron ore.

The large amount of the oxidized gas is combined with the fresh reducing gas supplied from the gas inlet 221, and therefore, their reducing power becomes lower. Further, the gas flow rate of the second reducing furnace 220 is considerably increased and a large amount of fine iron ore is circulated, and, therefore, the third circulating tube 241 is loaded too much. Consequently, the internal pressure of the reaction vessel severely fluctuates, and fine particles are elutriated out of the system in large amounts. Therefore, the gas consumption amount per ton of the iron ore increases, and the productivity becomes lower. Further, a part of coarse iron ore particles stays in the upper portion of the second reducing furnace 220, with the result, the fluidization of iron ore is adversely affected due to the fluctuation of the internal pressure of the reaction vessel. Further, because the reducing gas which has reacted with the coarse iron ore in the first pre-reducing furnace 210 is emitted through the second pre-reducing furnace and the first cyclone 240 to the outside, this reducing gas cannot be reused, and therefore, the gas utilization rate becomes lower.

SUMMARY OF THE INVENTION

In order to solve the above described disadvantages of the conventional fluidized bed reducing apparatus, the present inventor carried out research, and based on the result of the research, the present inventor came to propose the present invention.

The present invention is based on the following facts: the separation between coarse and medium/fine iron ores can improve the gas utilization and gas consumption rate. Re-use of the exhaust gas with a multi-stage operation can improve the gas utilization and gas consumption rate. The re-circulation of fine particles into the lower portion of the fluidized bed where the coarse particles are fluidized can improve the fluidization of the coarse particles, and thereby the state of fluidization of iron ores can be stable and brisk improving the gas consumption rate and solving the sticking problem in the reactor. In addition, a decrease in the circulation amount of the fine particles results in the solution to prevent the clogging of the circulating tubes and, thereby, the resident time in the reducing furnace can be increased so that the reduction would become more efficient.

Therefore it is an object of the present invention to provide a 3-stage fluidized bed reducing apparatus in which the advantages of the twin fluidized bed reducing apparatus is adopted, and the problems of the conventional fluidized bed reducing apparatus are solved, so that the gas utilization rate and the reducing rate can be improved, as well as decreasing the gas consumption rate.

In achieving the above object, the 3-stage fluidized bed iron ore reducing apparatus according to the present invention includes:

a single shaft first fluidized bed furnace where a raw fine iron ore is dried and pre-heated in a bubbling fluidization state;

a first cyclone for collecting fine iron ore particles from a exhaust gas of the first fluidized bed furnace;

a single shaft second fluidized bed furnace where the dried and pre-heated fine iron ore is pre-reduced in a bubbling fluidization state;

a second cyclone for separating the fine iron ore particles from an exhaust gas of the second fluidized bed furnace so as to re-circulate them;

a twin third fluidized bed furnace consisting of a first reaction furnace and a second reaction furnace, for separating the pre-reduced iron ore from the second fluidized bed furnace into coarse particles and medium/fine particles so that the coarse particles and medium/find particles are finally reduced in separate reactors in bubbling fluidization states;

a third cyclone for separating fine iron ore particles from the exhaust gas of the second reaction furnace of the third fluidized bed furnace so as to re-circulate them.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE INVENTION

Figure 1:
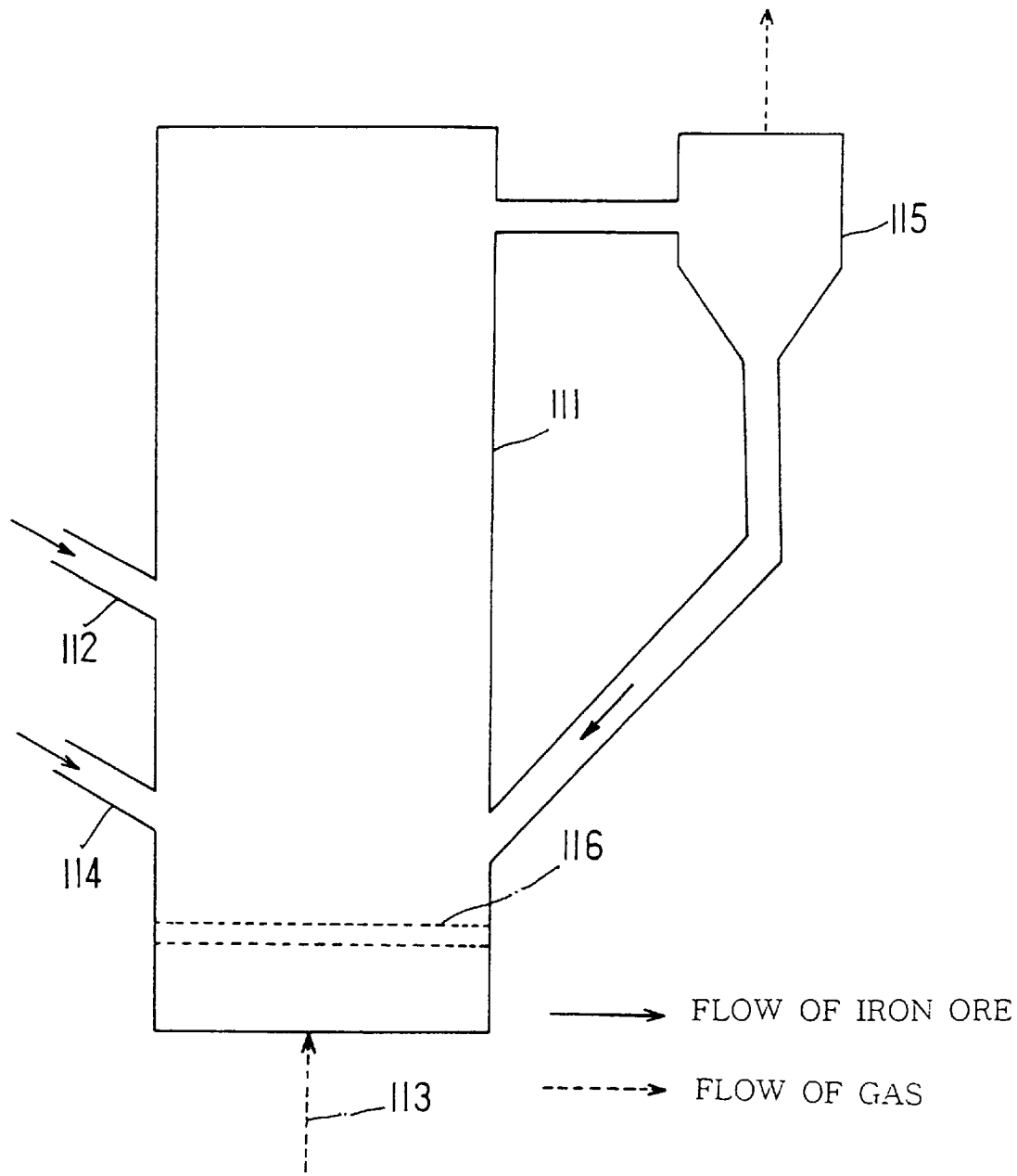
FIG. 1 illustrates the constitution of the conventional fluidized bed fine iron ore reducing apparatus.
Figure 2:
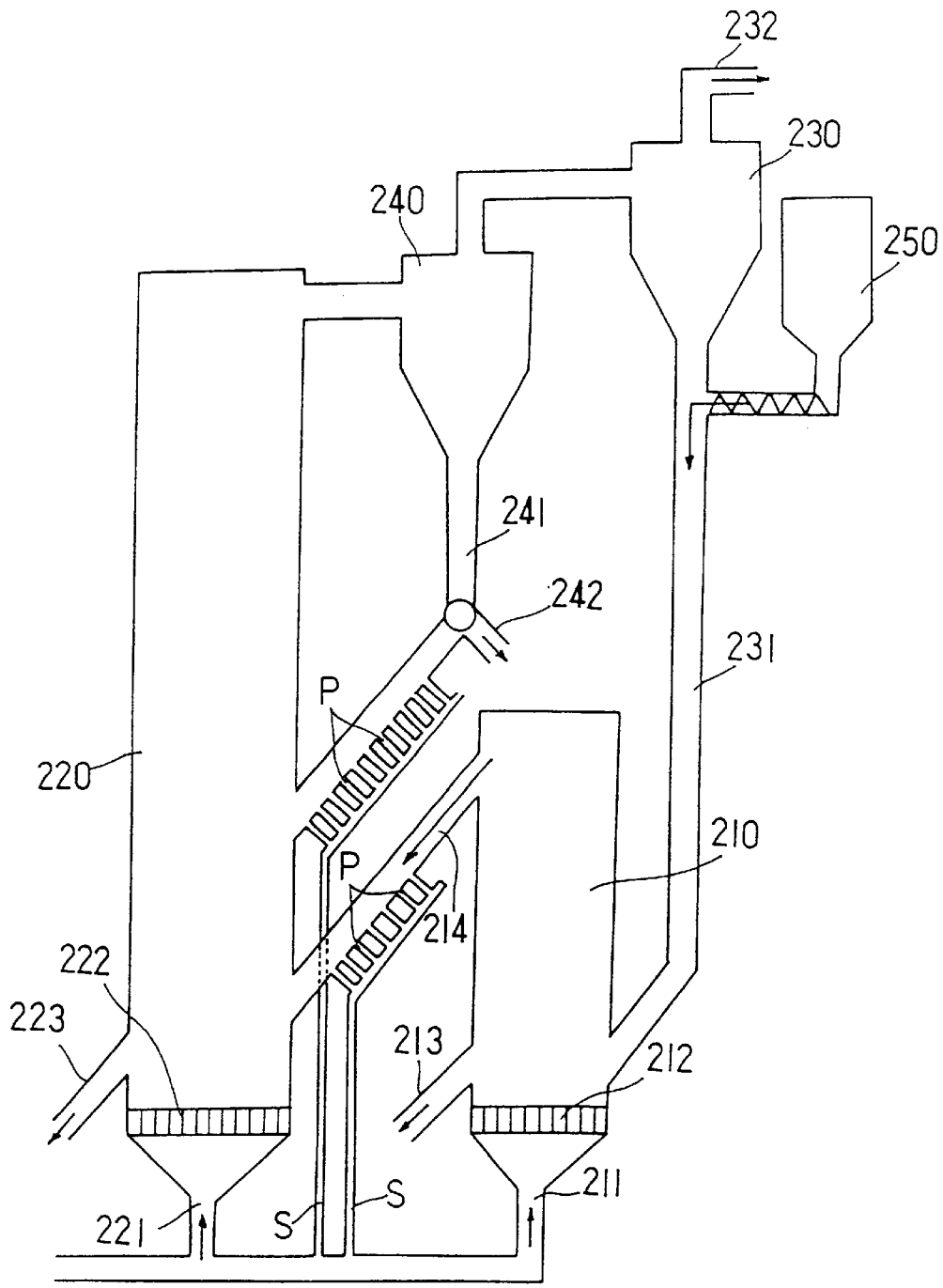
FIG. 2 illustrates the constitution of the conventional twin fluidized bed fine iron ore reducing apparatus.
Figure 3:
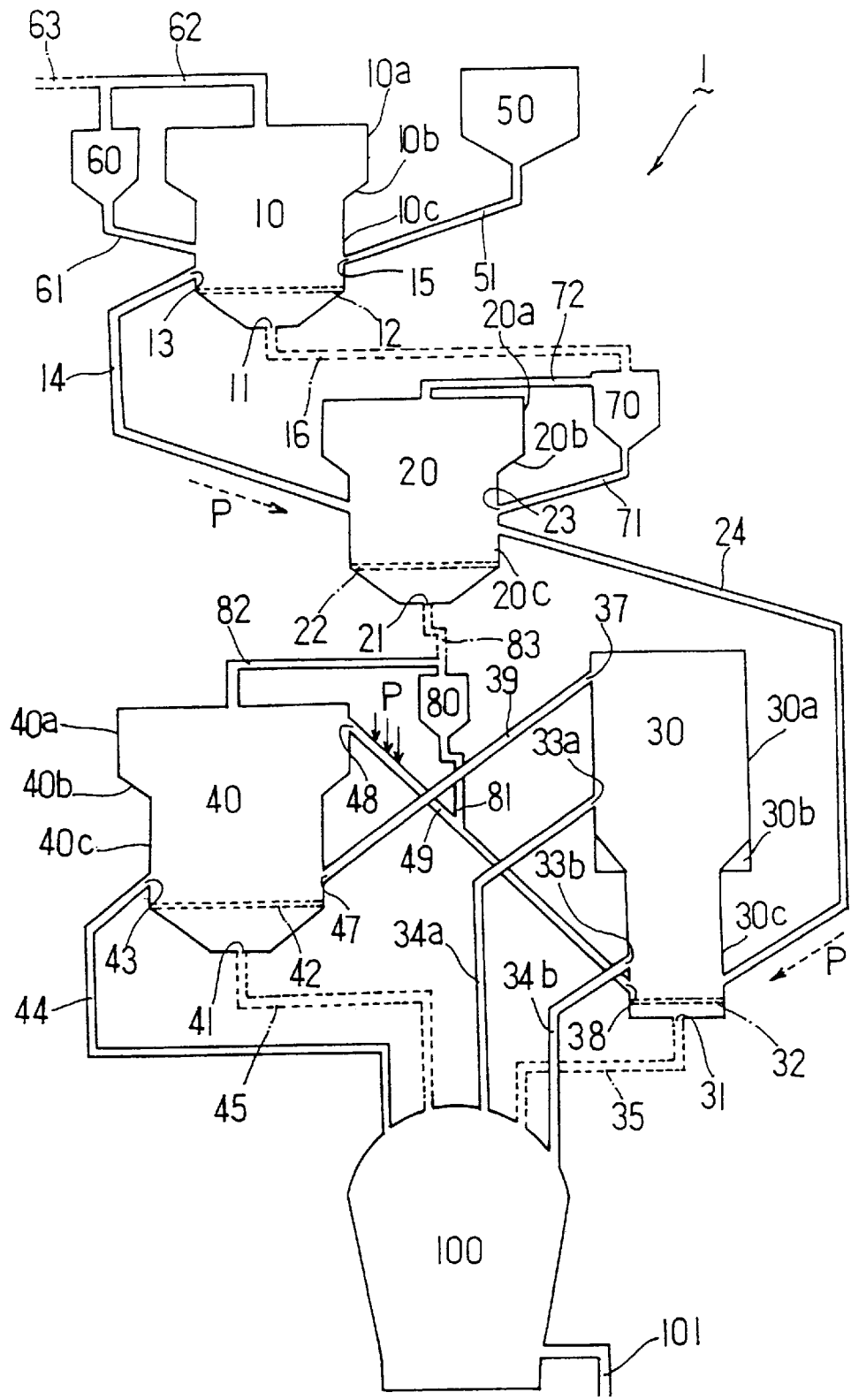
FIG. 3 illustrates the constitution of the 3-stage fluidized bed fine iron ore reducing apparatus according to the present invention.

As shown in FIG. 3, the 3-stage fluidized bed iron ore reducing apparatus 1 according to the present invention includes:

a single shaft first fluidized bed furnace 10 where a raw fine iron ore from a hopper 50 is dried and pre-heated in a bubbling fluidized state by an exhaust gas from a second cyclone 70;

a first cyclone 60 for collecting fine iron ore particles from an exhaust gas from the first fluidized bed furnace 10;

a single shaft second fluidized bed furnace 20 where the dried and pre-heated fine iron ore is pre-reduced in a bubbling fluidized state by an exhaust gas from the third cyclone;

a second cyclone 70 for separating the fine iron ore particles from an exhaust gas from the second fluidized bed furnace 20 so as to re-circulate them;

a twin third fluidized bed furnace 340 consisting of a first reaction furnace 30 and a second reaction furnace 40 for separating the pre-reduced iron ore from the second fluidized bed furnace 20 into coarse particles and medium/fine particles so that the coarse particles and medium/fine particles are finally reduced in separate reactors (but) in bubbling fluidization states; and a third cyclone 80 for separating fine iron ore particles from the exhaust gas of the second reaction furnace 40 of the third fluidized bed furnace 340 so as to re-circulate them to the first reaction furnace 30.

The first fluidized bed furnace 10 includes a first expanded part 10a, a first tapered part 10b and a first contracted part 10c. The bottom of the first contracted part 10c is provided with a first gas inlet 11 for supplying an exhaust gas from the second cyclone 70. A first gas distributor 12 is installed within the lower portion of the first contracted part 10c.

The first expanded part 10a and the first contracted part 10c are connected to the first cyclone 60 through a 19th conduit 62 and a second tube 61 respectively.

The first contracted part 10c is provided with a first discharge hole 13 on a side thereof, and an iron ore supply hole 15 on another side thereof.

The iron ore supply hole 15 is connected to a first conduit 51 which is connected to the hopper 50.

A discharge gas outlet 63 is formed on the top of the first cyclone 60, for finally releasing the exhaust gas.

The second fluidized bed furnace 20 includes a second expanded part 20a, a second tapered part 20b and a second contracted part 20c. A second gas inlet 21 is formed on the bottom of the second contracted part 20c, for supplying an exhaust gas from the third cyclone 80. A second gas distributor 22 is installed within the lower portion of the second fluidized bed furnace 20.

The second expanded part 20a and the second contracted part 20c are connected to the second cyclone 70 through an 18th conduit 72 and a fifth conduit 71 respectively.

The second contracted part 20c is provided with a second discharge hole 23 on a side thereof, and another side of the second contracted part 20c is connected to the first discharge hole 13 through a fourth conduit 14.

The top of the second cyclone 70 is connected to the first discharge gas supply hole 11 through a third conduit The first reaction furnace 30 of the third fluidized bed furnace 340 is a spouting type, and includes a third expanded part 30a, a third tapered part 30b and a third contracted part 30c. A third discharge gas supply hole 31 is formed on the bottom of the first reaction furnace 30, for supplying an exhaust gas of the melting furnace 100. A third gas distributor 32 is installed within the lower portion of the first reaction furnace 30. The third discharge gas supply hole 31 is connected through a seventeenth conduit 35 to the melting furnace 100.

The third expanded part 30a of the first reaction furnace 30 is provided with a third discharge hole 33a on a side thereof, and the third discharge hole 33a is connected through a 15th conduit 34a to the top of the melting furnace 100. The third contracted part 30c of the first reaction furnace 30 is provided with a fourth discharge hole 33b on a side thereof. The fourth discharge hole 33b is connected to the top of the melting furnace 100 through a 14th conduit 34b.

The third expanded part 30a of the first reaction furnace 30 is provided with a medium/fine iron ore discharge hole 37 on a side upper portion thereof, for discharging the medium/fine iron ores into the second reaction furnace 40.

The third contracted part 30c of the first reaction furnace 30 is provided with a fine ore inlet 38 on a side lower portion thereof, for feeding a fine iron ore from the second reaction furnace 40.

A seventh conduit 24 which communicates with the second discharge hole 23 of the second fluidized bed furnace 20 is connected to a side portion of the third contracted part 30c of the first reaction furnace 30 of the third fluidized bed furnace 340.

The second reaction furnace 40 of the third fluidized bed furnace 340 includes a fourth expanded part 40a, a fourth tapered part 40b and a fourth contracted part 40c. The fourth contracted part 40c is provided with a fifth discharge hole 43 on a side lower portion thereof, for discharging the medium/fine iron ore particles. A gas distributor 42 is installed within the lower portion of the fourth contracted part 40c, and a fourth discharge gas supply hole 41 is formed on the bottom thereof, while the fourth discharge gas supply hole 41 is connected to the melting furnace 100 through a 13th conduit 45.

The fifth discharge hole 43 is connected to the top of the melting furnace 100 through a 16th conduit 44.

The fourth contracted part 40c of the second reaction furnace 40 is provided with a medium/fine iron ore inlet 47 on a lower side wall thereof, for feeding medium/fine iron ores. The fourth expanded part 40c is provided with a fine ore discharge hole 48 on a side upper wall thereof.

The medium/fine iron ore inlet 47 is connected to the medium/fine iron ore discharge hole 37 of the first reaction furnace 30 through a medium/fine iron ore circulating tube 39. The fine iron ore discharge hole 48 is connected to the fine iron ore inlet 38 of the first reaction furnace 30 through a fine iron ore circulating tube 49.

The fourth expanded part 40a and the fine iron ore circulating tube 49 are connected to the third cyclone 80 respectively through a tenth conduit 82 and an 11th conduit 81. A ninth conduit 83 is connected to the top of the third cyclone 80.

The melting furnace 100 is provided with a pig iron discharge hole 101. Some purging gas supply holes P should be preferably formed on the fourth conduit 14, the seventh conduit 24 and the fine ore circulating tube 49, so that the clogging of the tubes can be prevented.

The second reaction furnace 40 of the third fluidized bed furnace 340 is provided with a fine ore discharge hole 48 on the top thereof. Thus the fine particles which are elutriating within the reaction furnace are re-circulated to the first reaction furnace 30 through the fine ore circulating tube 49. Under this condition, in order to improve the flow of the fine iron ore, a purging gas supply hole P should be preferably formed.

In FIG. 3, the dotted arrow indicates the gas flow, while the solid arrow indicates the iron ore flow.

In the first fluidized bed furnace 10, the second fluidized bed furnace 20 and the first and second reaction furnaces 30 and 40 of the third fluidized bed furnace 340, the reducing gas forms gas bubbles, and the gas bubbles briskly agitate the iron ore particles in a fluidization state. Consequently, the gas consumption unit is improved. Further, the upper portions of the furnaces are wider than the lower portions of them, and therefore, the superficial gas velocities within the upper portions become lower, so that the elutriation of the extremely fine particles can be inhibited.

Now a reducing method of fine iron ore using the 3-stage fluidized bed iron ore reducing apparatus of the present invention constituted as above will be described as follows.

A fine iron ore is supplied from the hopper 50 into the first fluidized bed furnace 10 by loading the iron ore in the exhaust gas which is supplied from the second cyclone 70 through the first gas inlet 11. This iron ore is, then, dried and pre-heated in a gas bubbling fluidizing state, and then is supplied through the first discharge hole into the second fluidized bed furnace 20.

The fine iron ore which is supplied into the second fluidized bed furnace 20 is pre-reduced while forming a bubbling fluidized bed by the exhaust gas of the third cyclone 80 (the exhaust gas being supplied through the second gas inlet 21 ). Then the pre-reduced iron ore is supplied through the second discharge hole into the first reaction furnace 30 of the third fluidized bed furnace 340.

In the second fluidized bed furnace, the iron ore is reduced to FeO.

Of the iron ore which is supplied to the first reaction furnace 30 of the third fluidized bed furnace 340, the coarse iron ore of over 4.75 mm stays mostly in the third contracted part 30c, while the medium/fine iron ores having particle sizes of 0.5–4.75 stay mostly in the third tapered part 30b and the expanded part 30a. These iron ores are finally reduced by the exhaust gas which is supplied from the melting furnace 100 through the third gas inlet 31. Then the coarse iron ore is supplied through the fourth discharge hole 33b to the melting furnace 100, while the medium/fine iron ores are supplied through the third discharge hole 33a to the melting furnace 100. Under this condition, the medium/fine iron ores pass through the left circulating tube of the third expanded part to be supplied through the medium/fine iron ore circulating tube 39 into the fourth contracted part 40c of the second reaction furnace 40 of the third fluidized bed furnace 340.

Of these medium/fine iron ores, the relatively large particles stay mostly in the fourth contracted part 40c, while the relatively small particles stay mostly in the fourth expanded part 40a and the fourth tapered part 40b. Thus the medium/fine iron ores are finally reduced by the exhaust gas which is supplied from the melting furnace 100 through the fourth gas inlet 41. Then the finally reduced medium/fine iron ores are supplied through the fifth discharge hole 43 into the melting furnace 100. Meanwhile the fine dusts are re-circulated into the lower portion of the first reaction furnace 30 through the tenth conduit 82, the third cyclone 80, the eleventh conduit 81 and the fine dust circulating tube 49, while another part of the fine dusts are re-circulated into the first reaction furnace 30 through the discharge hole 48 and the fine dust circulating tube.

In the third fluidized bed furnace 340, the reduction is carried out up to 80%.

In the third cyclone 80, extremely fine particles of 50 $\mu$m or less are separated from the gas.

In the case where the reduction is carried out by using the 3-stage fluidized bed reducing apparatus as in the present invention, the superficial gas velocities of the first and second fluidized bed furnaces 10 and 20 and the second reaction furnace 40 of the third fluidized bed furnace should be preferably 1.2–1.8 times higher than the minimum fluidization velocities of the fine iron ore particles within the furnaces if efficient fluidization and proper elutriating rates are to be achieved. The superficial gas velocity of the first reaction furnace 30 should be preferably 1.2–2.5 times higher than the minimum fluidization velocity.

Further, small amounts of hot reducing gas for purging should be preferably injected through the gas supply holes P of the fourth and seventh conduits 14 and 24, so that the reduction degree can be improved, and the conduits can be prevented from being clogged. Further, small amounts of hot reducing gas for purging should be injected through the gas supply holes P of the fine dust circulating tube 49, so that the fine dust circulating tube of the first reaction furnace 30 can be made smoothly, and that a back mixing of gas and clogging of the tubes can be prevented.

As described above, the present invention is based on the following facts. That is, the degradation of ore occurs mostly (up to 90% or more) at the pre-heating and pre-reducing stage. Further, in order to improve the gas utilization degree and the gas consumption rate, two reaction furnaces are provided in the third fluidized bed furnace 340. Thus the coarse iron ore and the medium/fine iron ores are reduced in separate fluidized beds, thereby optimizing the efficiency of the reducing operation.

Further, small amounts of hot reducing gas for purging are injected through the gas supply holes P into the iron ore of the fourth expanded part 40a of the second reaction furnace of the third fluidized bed furnace 340, and into the iron ore circulating tube of the third cyclone 80. Thus the fluidization in the lower portion of the first reaction furnace 30 becomes efficient. Further, the fine dusts are re-circulated through the fine dust circulating tube 49 and the lower portion of the eleventh conduit 81, so that they can be mixed with the coarse particles in the lower portion of the first reaction furnace 30. Therefore, the required gas velocity for the fluidization of the coarse particles can be decreased, and thereby the gas consumption rate is decreased and the productivity is improved.

Figure 4:
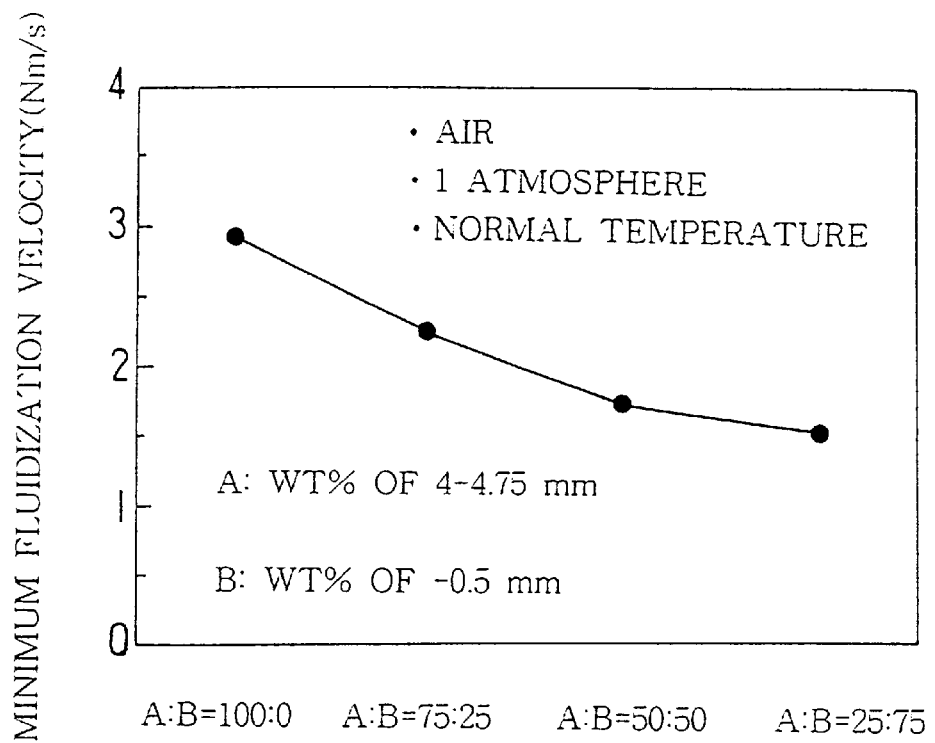
FIG. 4 is a graphical illustration showing the influence of the mixing ratio of the fine particles to the minimum fluidization velocity.

FIG. 4 illustrates the minimum particle fluidization velocity versus the mixing degree of the fine dusts. As shown in FIG. 4, the more fine dusts are mixed with the large particles, the lower minimum particle fluidized velocity is needed. Therefore, in the present invention, the coarse particles are mixed with the fine dusts through the circulating tubes, and therefore, the minimum fluidization velocity of the coarse particles becomes lower. Consequently, the gas consumption rate can be decreased, and therefore, the productivity is improved.

Now the present invention will be described based on actual examples.

<Example 1>

The reducing apparatus of FIG. 3 having the dimensions listed in Table 1 was constructed and the experiments were carried out under the conditions listed in Tables 2 to 4.

TABLE 1

Heights and inner diameters of the fluidized bed type furnaces

First fluidized bed furnace

| | |
|---|---|
| Inner diameter of contracted part: | 19 cm |
| Inner diameter of expanded part: | 41 cm |
| Height of tapered & contracted parts: | 192 cm |
| Height of expanded part: | 120 cm |

Second fluidized bed furnace

| | |
|---|---|
| Inner diameter of contracted part: | 19 cm |
| Inner diameter of expanded part: | 41 cm |
| Height of tapered & contracted parts: | 192 cm |
| Height of expanded part: | 120 cm |

Third fluidized bed furnace

First reaction furnace

| | |
|---|---|
| Inner diameter of contracted part: | 17 cm |
| Inner diameter of expanded part: | 25 cm |
| Height of tapered & contracted parts: | 400 cm |
| Height of expanded part: | 250 cm |

Third fluidized bed furnace

Second reaction furnace

| | |
|---|---|
| Inner diameter of contracted part: | 90 cm |
| Inner diameter of expanded part: | 124 cm |
| Height of tapered & contracted parts: | 175 cm |
| Height of expanded part: | 120 cm |

TABLE 2

Chemical composition and particle size distribution of raw fine iron ore

1. Chemical composition: T.Fe: 62.17, Fe: 0.51, $SiO_2$: 5.5 $TiO_2$: 0.11, Mn: 0.05, S: 0.012, P: 0.65, Crystal water: 2.32
2. Particle size distribution: −0.05 mm: 4.5%, 0.05–0.15 mm: 5.4%, 0.15–0.5 mm: 16.8%, 0.5–4.75 mm: 59.4%, 4.75–8 mm: 13.8%

TABLE 3

Composition, temperature and pressure of reducing gas

| | |
|---|---|
| 1. Gas composition: | CO: 65%, $H_2$: 25%, $CO_2$: 5%, $N_2$: 5% |
| 2. Temperature: | About 850° C. |
| 3. Pressure: | 0.5 $Kgf/cm^2$ |

TABLE 4

Superficial gas velocity in the fluidized bed reducing furnaces

First fluidized bed furnace

| | |
|---|---|
| Gas velocity in expanded part: | 1.22 m/s |
| Gas velocity in contracted part: | 5.34 m/s |

Second fluidized bed furnace

| | |
|---|---|
| Gas velocity in expanded part: | 1.22 m/s |
| Gas velocity in contracted part: | 5.34 m/s |

Third fluidized bed furnace

First reaction furnace

| | |
|---|---|
| Gas velocity in expanded part: | 3.35 m/s |
| Gas velocity in contracted part: | 7.34 m/s |

TABLE 4-continued

Superficial gas velocity in the fluidized bed reducing furnaces

Third fluidized bed furnace

Second reaction furnace

| | |
|---|---|
| Gas velocity in expanded part: | 0.015 m/s |
| Gas velocity in contracted part: | 0.25 m/s |

The fine iron ore was reduced in the above described manner, and the average gas utilization degree and the gas consumption rate were evaluated. The result showed that the average gas utilization degree was 32%, and the gas consumption rate was 1230 $Nm^3$/ton-ore. Further, the average reduction degree of iron ores discharged from the third discharge hole, the fourth discharge hole and the fifth discharge hole were 88–95%. The ore discharge can be achieved within 60 minutes after feeding the ore from the hopper. That is, the average resident time in a reaction furnace was about 20 minutes, therefore it can be concluded that the production rate is excellent.

Further, the pre-reduced iron ore was supplied to the second reaction furnace in which the reduction was carried out by classifying the iron ore based on the particle sizes. Therefore, the conventional problems such as the elutriation of the particles and the decrease in the reducing power of the gas due to the gas mixing were solved. Further, the fine iron ore particles are re-circulated into the first reaction furnace of the third fluidized bed furnace, and therefore, the fluidization becomes more brisk. Consequently, the large particles are prevented from being stuck, and the amount of the gas entering into the reaction furnace or gas velocity required for fluidization is decreased, and thereby the gas consumption unit is improved.

According to the present invention as described above, the reduction degree is relatively uniform regardless of the particle size of the iron ore. Further, reduced iron can be obtained for each class of different particle sizes, and therefore, when charging the reduced iron into the melting furnace, the reduced iron can be supplied properly in accordance with the kind of facility and the charging position. Further, when discharging the reduced iron, the discharge amount and the particle size can be adjusted by adjusting the flow rate or gas velocity of the reducing gas. Further, the reduction degree can be controlled by controlling the resident time of the iron ore in the furnace. Further, the 3-stage fluidizing operations are carried out all in the form of bubbling fluidized states, and therefore, the gas utilization degree and the gas consumption rate can be improved. Further, the structure of the apparatus is simple, and therefore, the clogging of the conduits and the defluidization phenomenon do not occur.

What is claimed is:

1. A 3-stage fluidized bed iron ore reducing apparatus for forming a gas pore fluidizing layer of a fine iron ore, for drying/pre-heating and reducing the iron ore, comprising:

a single shaft first fluidized bed furnace where a raw fine iron ore is dried and pre-heated in a bubbling fluidized state;

a first cyclone for collecting fine iron ore particles from an exhaust gas of said first fluidized bed furnace;

a single shaft second fluidized bed furnace where the dried and pre-heated fine iron ore is pre-reduced in a bubbling fluidized state;

a second cyclone for separating the fine iron ore particles from an exhaust gas from said second fluidized bed furnace so as to re-circulate them;

a twin third fluidized bed furnace consisting of a first reaction furnace and a second reaction furnace for separating the pre-reduced iron ore from said second fluidized bed furnace into coarse particles and medium/fine particles so that the coarse particles and medium/fine particles are finally reduced in separate reactors in bubbling fluidized states; and a third cyclone for separating fine iron ore particles from the exhaust gas of said second reaction furnace of said third fluidized bed furnace so as to re-circulate them to said first reaction furnace.

2. The 3-stage fluidized bed iron ore reducing apparatus as claimed in claim 1, wherein:

said first fluidized bed furnace comprises a first expanded part, a first tapered part and a first contracted part; a bottom of said first contracted part is provided with a first gas inlet for supplying an exhaust gas from said second cyclone; and a first gas distributor is installed within a lower portion of said first contracted part;

said first contracted part is provided with a first discharge hole on a side thereof, and an iron ore supply hole on another side thereof; said iron ore supply hole is connected to a first conduit which is connected to a hopper; and a discharge gas outlet is formed on a top of said first cyclone, for finally releasing the exhaust gas;

said second fluidized bed furnace comprises a second expanded part, a second tapered part and a second contracted part; a second gas inlet is formed on a bottom of said second contracted part for supplying an exhaust gas from said third cyclone; a second gas distributor is installed within a lower portion of said second fluidized bed furnace; and said second expanded part and said second contracted part are each connected to said second cyclone through respective conduits;

said second contracted part is provided with a second discharge hole on a side thereof, and another side of said second contracted part is connected to said first discharge hole through a conduit; and a top of said second cyclone is connected to said first discharge gas supply hole through a conduit;

said first reaction furnace of said third fluidized bed furnace comprises a third expanded part, a third tapered part and a third contracted part; a third discharge gas supply hole is formed on a bottom of said first reaction furnace for supplying an exhaust gas of a melting furnace; a third gas distributor is installed within a lower portion of said first reaction furnace; said third discharge gas supply hole is connected through a conduit to said melting furnace; and a conduit connected to a side portion of said third contracted part is connected to a second discharge hole of said second fluidized furnace;

said third expanded part of said first reaction furnace is provided with a third discharge hole on a side thereof, and said third discharge hole is connected through a conduit to a top of said melting furnace; said third contracted part of said first reaction furnace is provided with a fourth discharge hole on a side thereof; said fourth discharge hole is connected to a top of said melting furnace through a conduit; and a side upper portion of said first reaction furnace is connected to a lower portion of said second reaction furnace for discharging the medium/fine iron ores through a medium/fine iron ore circulating tube into said second reaction furnace; and said second reaction furnace of said third fluidized bed furnace comprises a fourth expanded part, a fourth tapered part and a fourth contracted part; said fourth contracted part is provided with a fifth discharge hole on a side lower portion thereof for discharging the medium/fine iron ore particles, said fifth discharge hole being connected to said melting furnace through a conduit; a fourth discharge gas supply hole is formed on a bottom of said second reaction furnace; a gas distributor is installed within a lower portion of said fourth contracted part; an upper portion of said second reaction furnace is connected to a lower portion of said first reaction furnace through a fine iron ore circulating tube so as to make the fine iron ore particles re-circulate into said first reaction furnace; said fourth expanded part and said fine iron ore particle circulating tube are respectively connected to said third cyclone through a pair of conduits; and a conduit is connected to a top of said third cyclone in communication with the second gas inlet of the second fluidized bed.

3. The 3-stage fluidized bed iron ore reducing apparatus as claimed in claim 1, wherein selected conduits and said fine iron ore circulating tube are respectively provided with at least one purging gas supply hole.

4. The 3-stage fluidized bed iron ore reducing apparatus as claimed in claim 2, wherein selected conduits and said fine iron ore circulating tube are respectively provided with at least one purging gas supply hole.

* * * * *

UNITED STATES PATENT AND TRADEMARK OFFICE
CERTIFICATE OF CORRECTION

PATENT NO. : 6,110,413
DATED : August 29, 2000
INVENTOR(S) : Uoo Chang JUNG et al.

It is certified that error appears in the above-indentified patent and that said Letters Patent is hereby corrected as shown below:

Title Page [54] title "3-STAGE FLUIDIZED BED TYPE FINE IRON ORE REDUCING APPARATUS HAVING X-SHAPED CIRCULATING TUBES" should read --3-STAGE FLUIDIZED BED REDUCING APPARATUS FOR REDUCING FINE IRON ORE--.

Title Page [22] PCT FILED "December 19, 1997" should read --December 22, 1997--.

Column 1 Lines 1-3 "3-STAGE FLUIDIZED BED TYPE FINE IRON ORE REDUCING APPARATUS HAVING X-SHAPED CIRCULATING TUBES" should read --3-STAGE FLUIDIZED BED REDUCING APPARATUS FOR REDUCING FINE IRON ORE--.

Column 2 Line 21 after "bed" delete --type--.

Column 6 Line 2 after "conduit" insert --16.--.

Signed and Sealed this

Fifteenth Day of May, 2001

*Attest:*

NICHOLAS P. GODICI

*Attesting Officer*   *Acting Director of the United States Patent and Trademark Office*